United States Patent [19]
Bestenreiner et al.

[11] 3,714,435
[45] Jan. 30, 1973

[54] DISTANCE MEASURING APPARATUS

[75] Inventors: Friedrich Bestenreiner, Gruenwald; Reinhold Deml, Munich; Alfred Kubitzek, Gruenwald; Kurt Borowski, Munich, all of Germany

[73] Assignee: Agfa-Gevaert Aktiengesellschaft, Leverkusen, Germany

[22] Filed: March 18, 1971

[21] Appl. No.: 125,737

[30] Foreign Application Priority Data

March 19, 1970 Germany.....................P 20 12 995.7

[52] U.S. Cl..........................................250/83.3 H
[51] Int. Cl...............................................G01s 9/64
[58] Field of Search....................250/83.3 H, 106 UC

[56] References Cited

UNITED STATES PATENTS

| | | |
|---|---|---|
| 2,206,036 | 7/1940 | Herson.......................250/83.3 H X |
| 2,919,350 | 12/1959 | Taylor et al......................250/83.3 H |
| 3,054,898 | 9/1962 | Westover et al.................250/83.3 H |
| 3,470,374 | 9/1969 | Jones.............................250/83.3 H |
| 3,500,048 | 3/1970 | Menke............................250/83.3 H |
| 3,508,051 | 4/1970 | Nichols et al................250/83.3 H X |

Primary Examiner—Archie R. Borchelt
Attorney—Michael S. Striker

[57] ABSTRACT

A base range finder wherein a projector directs a beam of infrared light against a spot on the object. The reflected light beam impinges on one of a series of photosensitive transducers, on different sections of a single transducer, or on a movable transducer depending on the angle between the emitted and reflected light beams, such angle being indicative of the distance from the object. The signals which are produced by one of the series of transducers or by the single or movable transducer are amplified and are used to change the position of the index of a measuring instrument and/or the position of the picture taking objective in a photographic apparatus.

10 Claims, 7 Drawing Figures

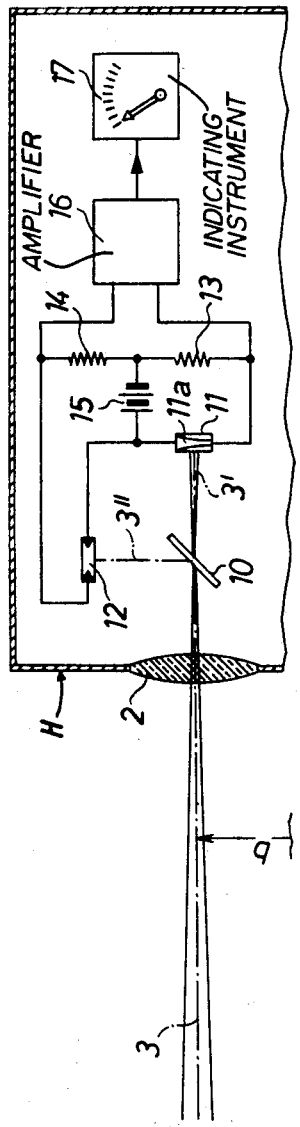
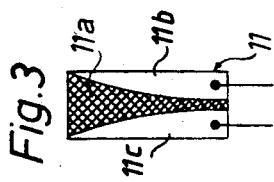
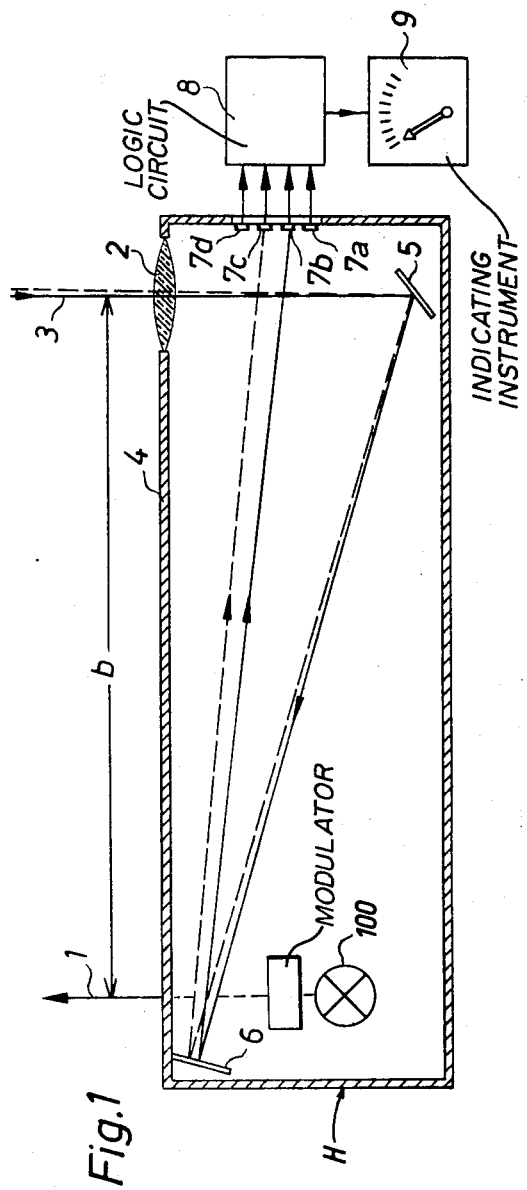

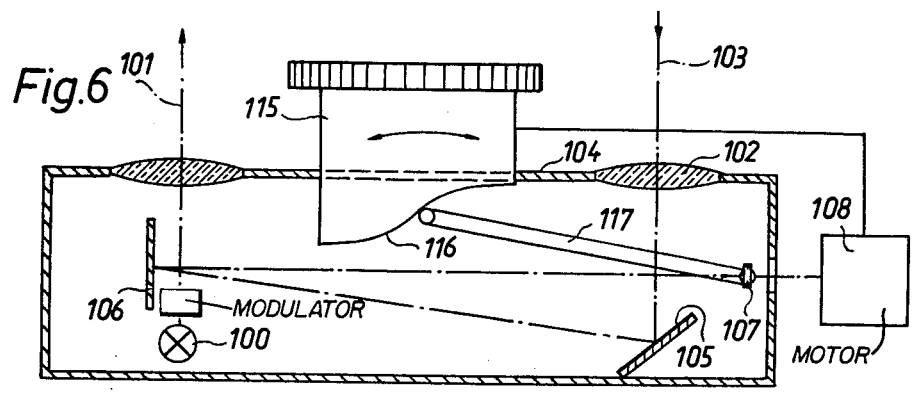
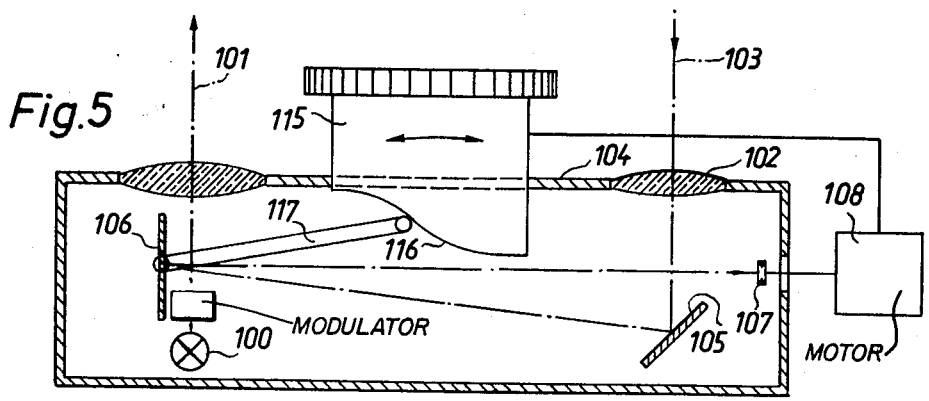
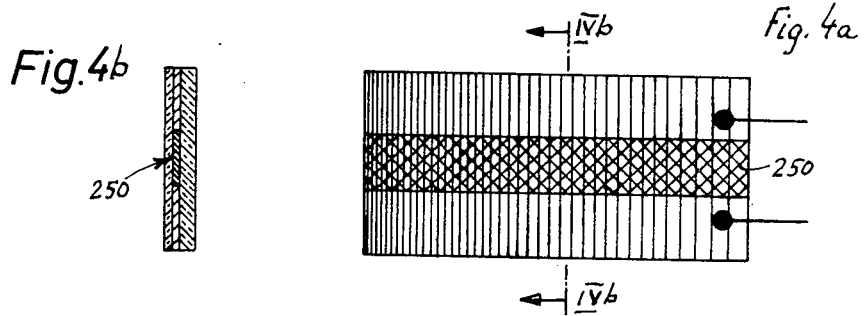

DISTANCE MEASURING APPARATUS

BACKGROUND OF THE INVENTION

The present invention relates to distance measuring apparatus in general, and more particularly to improvements in so-called base range finders wherein a light source emits a beam of light which is reflected on a spot of the object and wherein the angle between the emitted and reflected light beams is indicative of the distance from the object.

Such range finders normally comprise a receiver which includes one or more photosensitive transducers serving to produce signals which are indicative of the aforementioned angle and are used to determine the position of an index in a measuring instrument or the like. A drawback of the just described range finders is that they are too expensive and/or too complicated for incorporation in still cameras or in motion picture cameras.

SUMMARY OF THE INVENTION

An object of the invention is to provide a simple and reliable base range finder which is sufficiently compact and inexpensive to be suited for incorporation into photographic apparatus.

Another object of the invention is to provide a novel and improved base range finder which can be used as a means for indicating the distance from the object and/or as a means for automatically changing the position of the picture taking objective in a photographic apparatus.

A further object of the invention is to provide a base range finder with novel and improved frequency-selective photosensitive transducer means.

An additional object of the invention is to provide a base range finder with a novel electric circuit which is responsive to signals from the transducer means.

In accordance with a feature of the invention, the improved base range finder employs a light source which emits a beam of modulated infrared light and photosensitive transducer means which is exposed to the reflected light beam and is located at a predetermined distance from the light source whereby such distance corresponds to the base of the range finder.

Modulated infrared light is not visible to persons to be photographed and does not change the intensity of color of the objects to be photographed.

The novel features which are considered as characteristic of the invention are set forth in particular in the appended claims. The improved range finder itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a diagrammatic sectional view of a range finder which embodies one form of the invention;

FIG. 2 is an enlarged fragmentary diagrammatic sectional view of a second range finder;

FIG. 3 is an enlarged schematic front elevational view of a photosensitive transducer in the range finder of FIG. 2;

FIG. 4 (composed of FIGS. 4a and 4b) is another embodiment of a photosensitive transducer;

FIGS. 5 and 6 are other embodiments of a range finder.

DESCRIPTION OF THE PREFERRED EMBODIMENTS

Referring first to FIG. 1, there is shown a base range finder which comprises a light source or projector 100 serving to emit a beam 1 of infrared light which illuminates a spot on the object whose distance from the range finder is to be measured. The light beam 1 is modulated in a well known manner in order to prevent parasitic infrared light rays from affecting the measurement. Therefore, the range finder must embody means which is sensitive to the frequency-modulated light.

The illuminated spot on the object reflects a light beam 3 which enters the range finder through a window or lens 2. The distance $b$ between the light source 100 and the lens 2 equals the length of the base of a triangle whose apex coincides with the spot on the object. The apex angle of the triangle depends on the distance between the range finder and the object. Thus, the beams 1 and 3 are substantially parallel to each other when the object is located at an infinite distance from the range finder, and the angle between the beams 1 and 3 increases in response to movement of the object toward the range finder or vice versa. The light beam 1 is normal to the front wall 4 of the housing H of the range finder and the light beam 3 is normal to such front wall only when the object is located at an infinite distance from the housing. The housing H may constitute the body of a still camera or motion picture camera. The angle between the light beams 1 and 3 facilitates the determination of the distance between the range finder and the spot by further considering the distance $b$ between the point (light source 100) where the beam 1 leaves the housing H and the point (lens 2) where the beam 3 enters the housing. The angle is measured by electrical means and the result of the measurement can be indicated by an instrument and/or used for automatic adjustment of the picture taking lens in a photographic apparatus by way of a suitable servomotor.

The housing H of the range finder accommodates a first mirror 5 whose light-reflecting surface is inclined with reference to the optical axis of the lens 2 and which reflects the light beam 3 against a second mirror 6. The mirror 6 reflects the light beam 3 against one of a series or row of small photosensitive transducers (e.g., resistors) 7a, 7b, 7c, 7d. The transducers 7a–7d are positioned in such a way that one thereof is exposed to the light beam 3 when the spot is located at a first distance from the wall 4, that another thereof is exposed to the light beam 3 when the spot is located at a second distance from the wall 4, and so on. For example, the light beam 3 can impinge on the transducer 7d when it is substantially parallel to the light beam 1, i.e., when the object is located at an infinite distance from the locale of measurement. The transducer 7a can be positioned in such a way that it is reached by the light beam 3 when the spot is located at a distance of 2 meters from the wall 4. It is clear that the range finder can embody more or fewer than four transducers. Thus, the light beam 3 impinges on one of the plural transducers when the wall 4 is located at a particular distance from the object.

The output signals from the transducers 7a–7d are transmitted to a logical circuit 8 of known construction which can embody a selective amplifier serving to insure that only the modulated light beam 3 is utilized for the indication of distance. The signals from the logical circuit 8 are transmitted to an indicating instrument 9 (e.g., a galvanometer having a moving coil) which has an index or output member movable with reference to a properly calibrated scale provided with graduations indicating various distances from the object.

If the range finder is to be used in a photographic apparatus, the output member or index of the indicating instrument 9 can be tracked by a customary scanning element which can change the distance between the picture taking objective and the plane of the foremost unexposed film frame to insure that the image of the object is properly focused on the film. The scanning element can control the operation of a servomotor (e.g., an electric motor or a spring motor) to adjust the position of the objective in dependency on the position of the index of the indicating instrument 9. A suitable servo system for adjusting the objective of a camera in dependency on the position of the index of a moving-coil instrument is shown in FIG. 11 of U.S. Pat. No. 3,274,914 to Biedermann et al. It will be seen that the range finder of FIG. 1 is capable of furnishing automatic indications of the distance between the locale of measurement and the object and/or of automatically changing the position of the picture taking objective as a function of the position of the index in the instrument 9. The arrangement may be such that the position of the objective is changed in dependency on the distance from the object in response to actuation of the camera release element or a separate element which completes the circuit of the light source 100.

In the range finder of FIG. 2, the electrical circuitry which is influenced by the angle of the incoming modulated light beam 3 is different from the circuitry shown in FIG. 1. The light source 100 is not shown; this light source is mounted at the distance b from the optical element 2 which admits the reflected light beam 3 into the housing H of the range finder. The light beam 3 impinges on a partly light-transmitting beam splitter in the form of a mirror 10 which transmits one-half of infrared light and reflects the other half. The transmitted portion 3' of the light beam 3 impinges on a first photosensitive transducer 11 and the reflected portion 3" of the beam 3 impinges on a second photosensitive transducer 12. The distance between the photosensitive area of the transducer 11 and the mirror 10 is the same as the distance between this mirror and the photosensitive area of the transducer 12. These transducers are connected in two branches of a bridge circuit the other two branches of which contain fixed resistors 13 and 14 having the same resistance. One diagonal of the bridge circuit contains an energy source 15 (e.g., a battery) and the other diagonal contains a selective amplifier 16 and a moving-coil electrical measuring and/or indicating instrument 17.

The bridge circuit eliminates the effect of fluctuations of light intensity due to different distances from the object and/or due to different reflectivities of various spots on the object.

The photosensitive transducer 11 is a so-called discriminator transducer which produces signals of different intensity in dependency on the exact point of impingement of the transmitted light beam portion 3'. Its configuration is shown in FIG. 3. In contrast to a customary CdS photoconductive resistor wherein an insulating layer carries a film of photosensitive material which is applied thereto in vaporized state, the rectangular photosensitive film 11a of the transducer 11 shown in FIG. 3 is further provided with two light-obstructing coats 11b, 11c of silver solder which are applied thereon in such a way that the width of the exposed portion or strip of the film 11a varies gradually from one end toward the other end of the transducer. The coats 11b, 11c constitute two electrodes which are connected with the respective junctions of the bridge circuit. The sensitivity of the transducer is a function of the distance between the electrodes 11b, 11c as considered in different horizontal planes. If one disregards the statistic scattering of the film 11a, the sensitivity of the transducer 11 in a particular region of the exposed portion of the film 11a is inversely proportional to the width of the respective portion of the strip of exposed film 11a. Thus, the sensitivity of the transducer 11 can be selected in advance by proper (e.g., meandering) configuration of the electrodes 11b, 11c which determine the boundaries of the exposed portion or strip. The mounting of the transducer 11 behind the mirror 10 is such that the light beam portion 3' impinges on different portions of the exposed strip of the film 11a if the inclination of the beam 3 with reference to the beam 1 changes. Thus, the surface sensitivity of the transducer 11 is proportional to the inclination of the beam 3 with reference to the beam 1 and is hence proportional with the distance between the locale of measurement and the object. The amplifier 16 amplifies only those signals which are produced by the beam 3 and causes the index or output member of the instrument 17 to assume a position which is indicative of the measured distance from the object. The diameter of the beam portion 3' is assumed to be constant so that the resistance of the film 11a to the flow of current between the electrodes 11b, 11c depends on the exact position of the point where the beam 3' impinges on the exposed portion of the film 11a. The instrument 17 indicates the current which is proportional to the resistance of the transducer 11 and hence to the distance from the object.

It is clear that the transducer 11 can be replaced with a conventional transducer in combination with suitable masking or light-obstructing means (such as a grey filter or wedge 250 of FIGS. 4a and 4b or a diaphragm) which is placed in front of the photosensitive layer and can be provided with a tear drop-shaped cutout or a similar aperture which insures that the resistance varies in dependency on the exact position of the region where the beam 3' impinges on the exposed portion or strip of the photosensitive film 11a. The improved range finder is susceptible of many additional modifications. For example, the transducer 11 of FIG. 3 can be used in the range finder of FIG. 1 as a substitute for the transducers 7a–7d; the range finder of FIG. 1 then further embodies means which compensates for or prevents fluctuations in the intensity of the light beam 3. Furthermore, the range finder can employ a movable photosensitive transducer (see FIG. 6) which is driven by a motor or by spring means to follow the reflected light beam 3 and to come to a halt in response to the signal which is generated by its photosensitive film in response to impingement of the light beam 3. The position of the thus arrested transducer is then indicative of the distance between the locale of measurement and the object. Such a range finder also embodies a selective amplifier. It is further clear that the instrument 17 of FIG. 2 or the just mentioned mobile transducer can be coupled with the picture taking objective to change the position of such objective in dependency on the measured distance from the object.

FIG. 5 shows a portion of a photographic camera having a picture taking objective 115 which is adjustable by a motor 108 and has a cam face 116 tracked by a follower 117 which supports a pivotable mirror 106. The mirror 106 directs against the photosensitive transducer 107 a light beam only when the objective 115 assumes a position which is a function of the distance between the object and the range finder. The transducer 107 then arrests the motor 108. The reference characters 100-105 of FIG. 5 denote parts which are respectively analogous to the parts 100 and 2-5 shown in FIG. 1.

FIG. 6 illustrates a picture taking objective 115 which is movable by a motor 108 and has a cam face 116 tracked by a follower 117 which supports an adjustable photosensitive transducer 107. Thus, the objective 115 is operatively connected or coupled with the adjustable transducer. The motor 108 for the objective 115 is arrested in response to a signal from the transducer 107, namely, when the transducer is exposed to light which is reflected by the fixed mirror 106. The reference characters 100-105 of FIG. 6 denote parts which are respectively analogous to the parts 100 and 2-5 of FIG. 1.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a base range finder wherein a light source directs a first light beam against a spot of the object whereby the spot reflects the first light beam as a second light beam against photosensitive transducer means which is arranged to produce signals indicative of the angle between the first and second light beams and hence of the distance from the spot, the improvement which consists in that said first light beam is a modulated infrared light beam and said second light beam impinges upon said transducer means at a predetermined distance from said source, said distance corresponding to the base of the range finder.

2. The improvement as defined in claim 1, wherein said transducer means comprises a plurality of discrete transducers and wherein a different transducer is exposed to said second beam at each of a plurality of different distances from the spot.

3. The improvement as defined in claim 2, further comprising a measuring instrument having a movable output member and a logical circuit connected with said discrete transducers and having selective amplifier means responsive to the modulation frequency of said second beam to determine the position of said output member as a function of the origin of the signal which is transmitted to said circuit.

4. The improvement as defined in claim 1, wherein said transducer means comprises discrete first and second transducers, and further comprising beam divider means arranged to divide said second beam into equal first and second beam portions which respectively impinge upon said first and second transducers, and a bridge circuit having a plurality of branches, a first diagonal including a source of electrical energy and a second diagonal including selective amplifier means and a measuring instrument having a movable output member, said transducers being connected in separate branches of said bridge circuit and said first transducer having a plurality of portions of different sensitivity, said first beam portion impinging upon different portions of said first transducer at each of a plurality of different distances from the spot whereby the sensitivity of that portion of said first transducer which is exposed to said first beam portion determines the position of said output member.

5. The improvement as defined in claim 4, wherein said transducers are equidistant from said beam divider means.

6. The improvement as defined in claim 4, wherein said first transducer comprises a film of photosensitive material and light-obstructing means exposing a selected area of said film, said selected area having said portions of different sensitivity.

7. The improvement as defined in claim 4, wherein said portions of different sensitivity together form a strip having sections of different width.

8. The improvement as defined in claim 1, further comprising means for moving said transducer means with reference to said source to place said transducer means into the path of said second beam, and means for arresting said transducer means in response to exposure to said second beam.

9. The improvement as defined in claim 8, further comprising means for indicating the positions of said transducer means, such positions being indicative of the distance from the spot.

10. The improvement as defined in claim 8, further comprising a camera having movable picture taking objective means coupled with said transducer means.

* * * * *